United States Patent [19]

Walkow et al.

[11] Patent Number: 4,941,349
[45] Date of Patent: Jul. 17, 1990

[54] COAXIAL COILED-TUBING CABLE HEAD

[75] Inventors: Arnold M. Walkow, Houston, Tex.; William S. Kennedy, Groveland; Kenneth J. Wolfe, Sunnyvale, both of Calif.

[73] Assignee: Western Atlas International, Inc., Houston, Tex.

[21] Appl. No.: 368,766

[22] Filed: Jun. 20, 1989

[51] Int. Cl.⁵ ............................................. E21B 47/00
[52] U.S. Cl. ..................................... 73/151; 439/194; 439/589; 439/624; 285/133.2
[58] Field of Search .................. 73/151; 439/190, 192, 439/194, 199, 274, 275, 278, 279, 587, 588, 589, 624; 166/65.1; 174/47; 285/133.2, 137.2, 39, 142

[56] References Cited

U.S. PATENT DOCUMENTS

| | | | |
|---|---|---|---|
| 1,891,416 | 12/1932 | Harris | 175/96 |
| 3,285,629 | 11/1966 | Cullen et al. | 439/192 |
| 4,648,444 | 3/1987 | Busch | 166/65.1 |
| 4,671,379 | 6/1987 | Kennedy et al. | 181/106 |

Primary Examiner—John Chapman
Assistant Examiner—Kevin D. O'Shea
Attorney, Agent, or Firm—William A. Knox

[57] ABSTRACT

A cable head connector is provided for coupling a plurality of nested tubes, each one of which conducts a different fluid, to a downhole geophysical tool such as a seismic sound source. The device includes separate clamps for individually gripping the respective nested tubes. Conduits are furnished for fluidly bypassing the respective clamping devices. The fluid bypass conduits are fluidly coupled to a distribution module for delivering the different fluids individually to the downhole geophysical tool. Additional facilities are provided for sending electrical control signals to the tool.

6 Claims, 2 Drawing Sheets

COAXIAL COILED-TUBING CABLE HEAD

BACKGROUND OF THE INVENTION

1. Field of the Invention

This invention is concerned with a downhole seismic sound source which requires not only electrical control signals but also at least two separate fluids to control its operation, such as may be found in Class 181.

2. Discussion of the Prior Art

This invention finds particular use with downhole geophysical tools such as, for example, the seismic sound source (a.k.a. "the tool") as taught by U.S. Pat. No. 4,671,379, issued June 9, 1987 in the names of William S. Kennedy et al. In that patent, the tool provides a means for exciting the borehole fluid with acoustic waves at some selected depth or depths within the borehole. Inflatable sleeves at each end of the tool provide quarter or half wave reflectors so as to allow the tool to produce standing waves in the borehole at selected resonant frequencies. The desired resonant frequency is controlled by the separation of the inflatable sleeves. The standing waves thus created in the borehole fluid are radiated through the borehole wall and propagate through the earth to seismic detectors that may be located on the surface of the earth and/or in another adjacent borehole.

To operate the sound source, electrical control signals are required to drive a mechanical oscillator that creates a pulsating water head acting against a diaphragm that is exposed to the borehole fluid. The resultant pulsations of the diaphragm set up the desired standing waves in the borehole fluid. The sleeves are inflated by a gaseous fluid, preferably helium, although nitrogen may also be used. The entire assembly is, of course, suspended by a wireline of suitable sizes to support the half-ton-or-so weight of the tool.

In the past, tubing and hoses for the various fluids, as well as the electrical control lines were coiled externally around the wireline. Fluid pressures that are required to equalize the pressure inside the tool with respect to the static pressure existing at the bottom of a borehole that is ten or fifteen thousand feet deep, are on the order of 5000 to 7500 psi. Such pressures required extremely heavy hoses. Wrapped around the wireline, those hoses presented a very awkward, clumsy package that was difficult to handle, to reel in and out of the borehole and to pass over the well-head sheaves.

It is a purpose of this invention to provide a cable head for interfacing a coiled tubing arrangement, that includes a plurality of nested fluid conduits, electrical conductors and a wireline, all coaxially mounted within an outer tube, with a downhole seismic sound source.

SUMMARY OF THE INVENTION

In accordance with this invention, we provide a cable head connector for coupling a downhole seismic sound source to a plurality of nested coaxially-arranged flexible tubes. The cable head includes an outer sleeve having a wall, inside of which is a clamping means for clamping a first one of the plurality of nested tubes. A fluid distribution block is coupled to the clamping means. A first plurality of radial fluid ports are drilled in the fluid distribution block. A first manifold means is disposed interiorly around the wall of said outer sleeve, opposite the first plurality of radial fluid ports, for receiving a fluid flow therefrom. A second clamping means is mounted in the fluid distribution block for clamping a second one of the nested tubes. A second plurality of radial fluid ports are drilled in the fluid distribution block below the first set of ports. A second manifold means, is disposed interiorly around the wall of the outer sleeve, opposite the second plurality of radial fluid ports, for receiving fluid flow therefrom. Mounted in the fluid distribution lock, there is a means for gripping the wireline that is mounted interiorly of the second one of the nested tubes. Third and fourth manifolds are disposed interiorly around the wall of the outer sleeve, below the first and second manifolds. A tool interface block is interconnected between the outer sleeve and the downhole seismic sound source. The tool interface block includes third and fourth radial fluid flow ports disposed respectively opposite the third and fourth manifolds for receiving fluid flow therefrom. A first plurality of longitudinal passageways are provided in the wall of the outer sleeve for fluidly interconnecting the first and third manifolds. A second plurality of longitudinal passageways are provided in the wall of the outer sleeve for fluidly interconnecting the second and fourth manifolds. First and second fluid conduits are drilled longitudinally in the tool interface block which are in fluid communication with the third and fourth radial fluid ports, for delivering the first and second fluids to said downhole seismic sound source.

BRIEF DESCRIPTION OF THE DRAWINGS

These and other benefits of our invention will be better understood by reference to the appended detailed description and to the drawings wherein.

DETAILED DESCRIPTION OF THE PREFERRED EMBODIMENT

Figure 1:
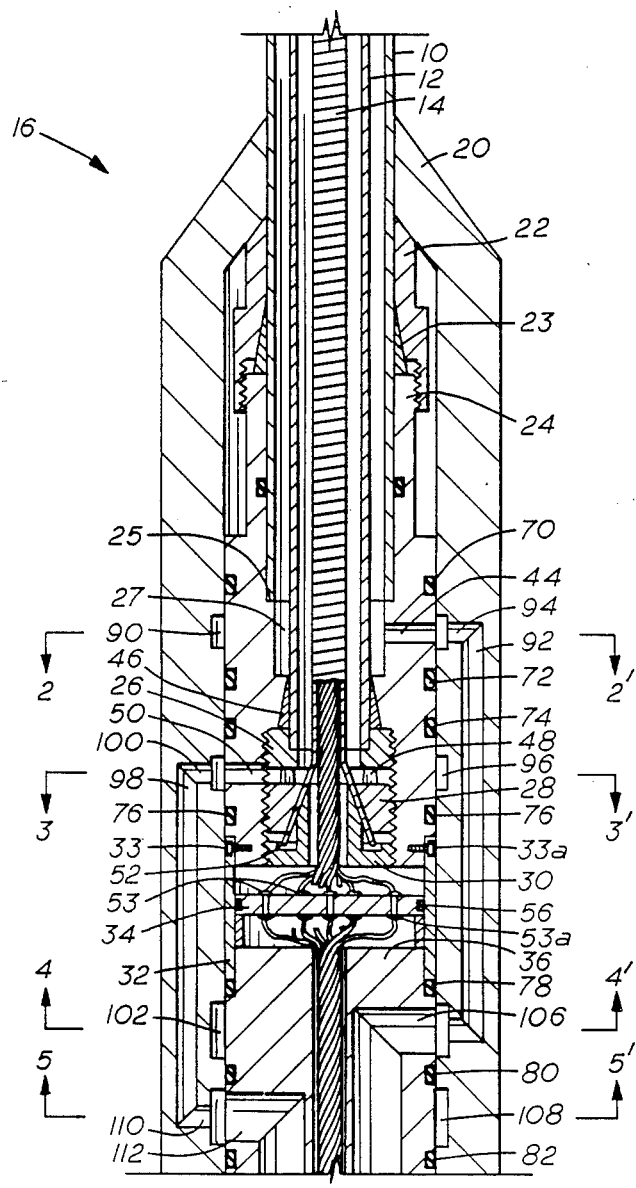
FIG. 1 is a cross-sectional view of the cable head of this invention.
Figure 1:
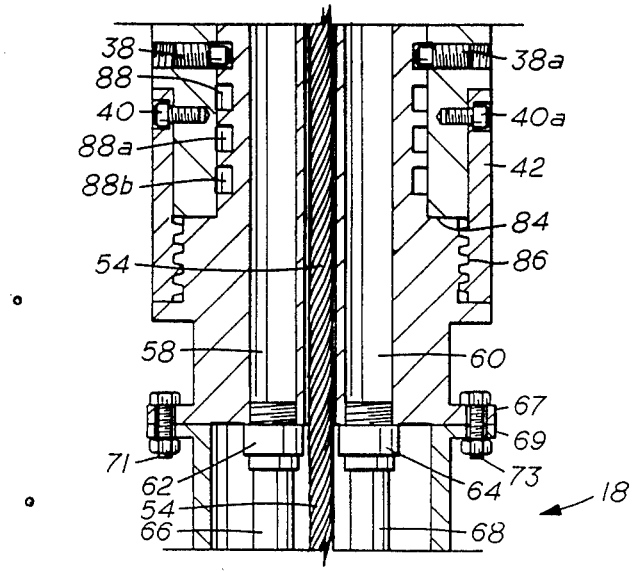

Refer now to FIG. 1. The coiled tubing arrangement that we prefer to use for this application consists of an outer flexible steel tube 10, 1.5 inches in diameter. Inside the outer tube 10, we insert a 0.625-inch flexible steel tube 12. Inside the inner tube 12, there is inserted a 7-conductor, 0.375-inch armored wireline 14. A fluid, such as water, is circulated through the annulus between the outer tube 10 and the inner tube 12. A second fluid, such as helium, is pumped through the annulus between the wireline 14 and the inside of inner tube 12. Additional tubes for other fluids could, of course, be coaxially mounted inside the outer tube. Alternatively, the wireline and the inner tube could be positioned inside the outer tube side-by-side rather than coaxially.

The tubing that we prefer to use is a special steel tubing that is bendable and that can be flexed a plurality of times without becoming work-hardened and brittle. The tubing is QT-70 coiled tubing, A-606, type 4, made by Quality Tubing, Inc. of Houston, Texas. It has a minimum yield strength of 70,000 psi and a tensile strength of 75,000 psi.

The problem to be solved is to mechanically firmly anchor individually, the concentrically arranged tubes and the wireline to the cable head shown generally as 16 and at the same time to distribute the respective fluids and electrical control signals to the corresponding fluid and electrical lines in the tool, the top part of which is shown as 18.

Referring back to FIG. 1, the cable head 16 includes the following major items:
Sleeve 20;
Outer tube clamping assembly 22;
Fluid distribution block 24;
Inner tube clamping bushing assembly 26;
Standoff bushing 28;
Wireline armor clamping bushing 30;
Spacer sleeve 32;
Gas barrier 34;
Tool interface block 36;
Shear pins 38, 38a;
Torque bolts 40, 40a; and
Tractor thread sleeve 42.

Figure 2:
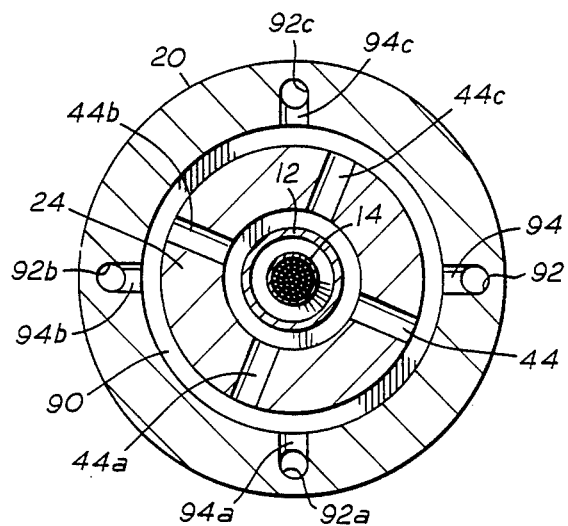
FIG. 2 is a cross-section along line 2—2'.

Initially, we slide sleeve 20 back up over the coiled tubing arrangement so that the internal parts can be assembled. Outer tube 10, inner tube 12 and wireline 14 are cut to specific lengths as shown in the FIG. 1. Outer sleeve clamping (gripping) assembly 22 is internally threaded and has a tapered passageway for receiving a Lenz ferrule 23. Fluid distribution block 24, which has an external thread at its upper end, is screwed into outer tube clamping assembly 22 and forces the Lenz ferrule to firmly grip and anchor outer tube 10. Outer tube 10 terminates on an internal shoulder 25 in fluid distribution block 24. Distribution block 24 includes a first plurality of radially drilled ports 44, 44a, 44b, 44c, as shown in FIGS. 1 and 2. Beneath port 44 there is an annulus between the inner wall of the gas distribution block 24 and inner tube 12. That annulus, shown as 27, forms a sump for entrapping debris.

Figure 3:
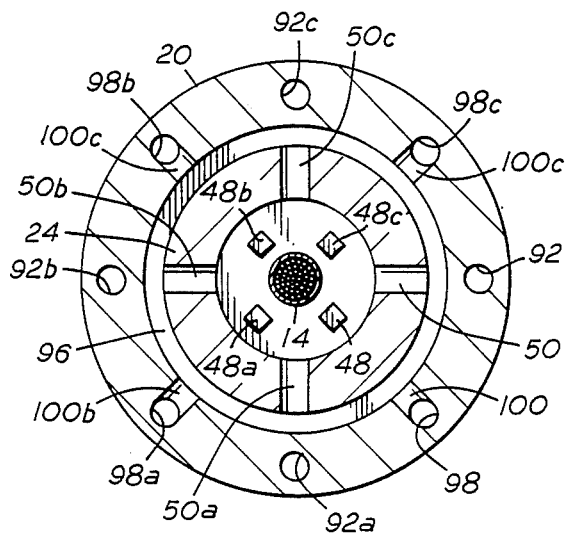
FIG. 3 is a cross-section along line 3—3'.
Figure 4:
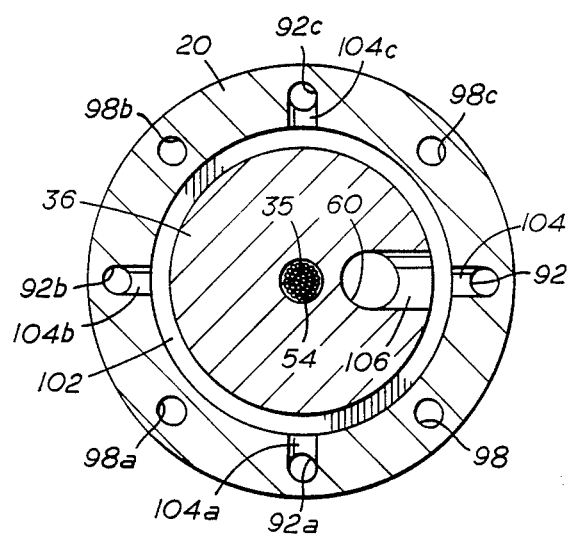
FIG. 4 is a cross-section along line 4—4'.

The lower portion of gas distribution block 24 is internally threaded to receive three bushings as shown and includes an upwardly tapered portion for receiving a Lenz ferrule 46. Inner tube clamping (gripping) bushing 26 is screwed upwardly to force the Lenz ferrule to firmly grip and lock inner tube 12 in place. Thereafter, standoff bushing 28 is screwed against the lower face of inner tube clamping bushing assembly 26. Standoff bushing 28 has protuberances 48, 48a, 48b and 48c as shown in FIGS. 1 and 3 which serve to provide clearance between bushings 26 and 28 when bushing 28 is tightened. Their purpose will be discussed later. A second plurality of ports 50, 50a, 50b and 50c are drilled radially in fluid distribution block 24 as shown in FIGS. 1 and 3. Bushing 28 has an inner tapered passageway against which, the strands, such as 52, of the wireline armoring are spread. Wireline armor clamping bushing 30 is next screwed into the bottom of gas distribution block 24 to firmly wedge the strands of armoring in place.

A spacer sleeve 32 is secured to the lower end of gas distribution block 24 and is fastened thereto by screws 33, 33a. Spacer sleeve 32 includes a gas barrier 34 that rests on an internal seat in spacer sleeve 32. Gas barrier 34 is required for sealing off possible gas leakage through the strands of wireline 14 and into the electrical conductor conduit 35 that is drilled in tool interface block 36. Gas barrier 34 includes a plurality of sealed feed-through electrical terminals such as 53, 53a to accommodate the electrical conductors such as 54. Two electrical conductors and two terminals are shown but many more may be used as required. From the terminals 53 and 53a, electrical conductors 54 pass through conduit 35 and on into the tool 18. An 0-ring 56 provides a further seal.

Tool interface block 36 is secured to the bottom of spacer sleeve 32 by any convenient means. Tool interface block includes first and second fluid conduits 58 and 60. Suitable pipe fittings 62 and 64 provide connection means to flexible fluid pipes 66 and 68 from tool 18. Tool interface block 36 includes a flange 67 that mates with a corresponding flange 69 at the top of tool 18. The two are fastened together by suitable bolts 71 and 73, of which two are shown but many more may be used.

Once the various internal parts have been assembled as above described, a plurality of O-rings are mounted on the respective components such as shown at 70, 72, 74, 76, 78, 80 and 82, which act as fluid seals. Tractor thread sleeve 42 is secured to sleeve 20 by temporary torque bolts 40 and 40a. We now slide sleeve 20 back down over the assembled internal parts and over tool interface block 36 towards seat 84, below which, tractor thread sleeve 42 engages tractor threads around tool interface block 36 in the region labeled 86. The tractor threads in region 86 are preferably tapered Acme threads such that a suitable number of turns of sleeve 20 will bring it snugly down against seat 84 on tool interface block 36. Shear pins 38 and 38a are now inserted and torque bolts 40 and 40a are removed. Two shear pins are shown, but preferably more may be used. Tool 18 is now supported, through interface block 36, solely by the shear pins such as 38 and 38a. Fishing neck grooves 88, 88a and 88b are cut around tool interface block 36. In the event that the tool 18 becomes hung up in the borehole such that sleeve 20 breaks free at the shear pins, an overshot fishing tool may be lowered into the borehole to engage the fishing neck grooves, thereby to recover the tool.

Figure 5:
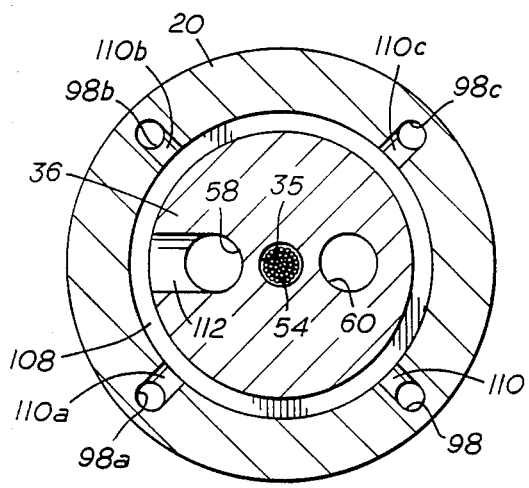
FIG. 5 is a cross-section along line 5—5'.

Let us now review certain features of sleeve 20 with reference to FIGS. 1–5. In FIGS. 3 and 5, sleeve 20 is shown to be rotated 45 degrees clockwise with respect to the orientation in FIG. 1, in order to more clearly show details of construction.

A first groove 90, is turned on the inside wall of sleeve 20, approximately opposite radial port 44 in fluid distribution block 24. A fluid passageway 92 is drilled longitudinally through the wall of sleeve 20. One such passageway is shown in FIG. 1, but four or more such as 92a–92c may be used as shown in FIG. 2 which is a cross section along line 2—2'. Short radial slots 94–94c fluidly interconnect groove 90 with the respective longitudinal passageways 92–92c.

A second groove 96 is provided on the inside wall of sleeve 20, approximately opposite ports 50 in fluid distribution block 24. Longitudinal passageways 98–98c and radial slots 100–100c are provided in the wall of outer sleeve 20 as shown in FIGS. 1 and 3.

A third groove 102 is provided at the bottom of passageways 92–92c, which communicates with those passageways through radial slots 104–104c. See FIGS. 1 and 4. A radial port 106 provides fluid communication between groove 102 and conduit 60 in tool interface block 36.

A fourth groove 108 is provided, located at the bottom of longitudinal passageways 98–98c, which are terminated by radial slots 110–110c as shown in FIGS. 1 and 5. A radial port 112 provides fluid communication between groove 108 and conduit 58 in tool interface block 36.

It is to be observed that the fluid conduits 58 and 60 along with their corresponding ports 106 and 112, are considerably larger in diameter than are passageways 92 and 98. It is necessary to minimize the diameter of passageways 92 and 96 to avoid undue weakening of the wall of sleeve 20, whereas tool interface block is inherently much more massive so that much larger conduits or passageways may be used.

It is clear, therefore, that we have provided a means for separately gripping each one of the plurality of the coaxially arranged nested tubes, each one of which conducts a different fluid. The longitudinal passageways in the wall of the outer sleeve 20, in fluid communication with the various radially disposed ports and the four respective manifolds provide means for fluidly bypassing the gripping means. The tool interface block provides means for separately distributing the different fluids to the downhole geophysical tool. We furthermore provide means for gripping a wireline that is associated with a one of the coaxially arranged nested tubes and for delivering electrical control signals to the downhole geophysical tool.

In our presently preferred mode of operation, a first fluid, such as water is pumped down through the annulus between outer tube 10 and inner tube 12 through radial ports 44–44c and into groove 90. Groove 90 serves as a first manifold interiorly disposed around the wall of sleeve 20 to distribute the first fluid through radial slots 94–94c and into longitudinal passageways 92–92c, to third groove or manifold 102 whence the fluid can flow through radial ports 106, through conduit 60 and pipe 68, into tool 18 as needed.

A second fluid, such as helium or nitrogen, is pumped through the annulus between the wireline 14 and inner tube 12, through ports 50–50c in fluid distribution block 24 and into second groove or manifold 96. It is to be observed that the standoffs 48–48c on standoff bushing 28 provide free flow of the second fluid from the annulus between wireline 14 and second tube 12, into the radial ports 50–50c. As before, second groove or manifold 96, that is interiorly disposed in the wall of outer sleeve 20, directs the second fluid into longitudinal passageways 98–98c via radial slots 110–110c. Fourth groove or manifold 108 receives the fluid flow from the respective passageway through radial slots 110–110c and directs the fluid into radial port 112, through conduit 58 and pipe 66, thence into tool 18.

Electrical control signals, of course, are sent to tool 18 via electrical conductors 54 as before described.

Those skilled in the art will doubtless conceive of variations in the design and operation of this invention, which nevertheless will fall within the scope and spirit of this disclosure which is limited only by the appended claims.

We claim as our invention:

1. A cable head connector for coupling a plurality of nested coaxial fluid-conducting tubes to a downhole geophysical tool, each said tube being adapted to conduct a different fluid, comprising:
    a plurality of means for separately gripping in turn, each one of the plurality of nested fluid-conducting tubes;
    means, in fluid communication with the respective nested tubes, for fluidly bypassing, internally, a first means for gripping and for fluidly bypassing, externally, a second means for gripping; and
    means, in fluid communication with the fluid bypass means, for distributing separately, each of the respectively different fluids to the downhole geophysical tool.

2. The cable head connector as defined by claim 1, comprising:
    means for gripping a wireline associated with a one of said nested tubes, said wireline including electrical conductors for providing control signals;
    means for fluidly bypassing, externally, the means for wireline gripping; and
    means for delivering said control signals to said downhole geophysical tool.

3. A cable head connector for coupling a downhole geophysical tool to a plurality of nested coaxially-arranged flexible tubes, comprising:
    an outer sleeve having a wall;
    means in said outer sleeve for gripping a first nested tube;
    a fluid distribution block mounted in said sleeve;
    a first plurality of radial fluid ports in said fluid distribution block in fluid communication with said first tube;
    first manifold means, disposed interiorly around the wall of said outer sleeve for receiving flow of a first fluid from said first radial ports;
    means in said fluid distribution block for gripping a second nested tube;
    a second plurality of radial fluid ports in said fluid distribution block in fluid communication with said second tube;
    second manifold means, disposed interiorly around the wall of said outer sleeve for receiving flow of a second fluid from the second plurality of radial ports;
    means for gripping a wireline associated with the second of said nested tubes;
    third and fourth manifolds disposed interiorly around the wall of said outer sleeve, below said first and second manifolds;
    a first longitudinal passageway in the wall of said outer sleeve in fluid communication with said first and third manifolds;
    a second longitudinal passageway in the wall of said outer sleeve in fluid communication with said second and fourth manifolds;
    a tool interface block, interconnected between said outer sleeve and the downhole geophysical tool, said tool interface block including third and fourth radial fluid flow ports in fluid communication with said third and fourth manifolds; and
    first and second conduit means in said tool interface block in fluid communication with said third and fourth radial fluid ports, for delivering first and second fluids to said downhole geophysical tool.

4. The cable head connector as defined by claim 3, comprising:
    a spacer sleeve for coupling said fluid distribution block to said tool interface block;
    a gas barrier mounted in said spacer sleeve; and
    a plurality of sealed feed-through electrical terminals mounted in said gas barrier to which are attached, on one side of said barrier, electrical conductors from said wireline and to which are attached on the other side of said barrier, a plurality of electrical conductors connected to the downhole geophysical tool.

5. The cable head connector as defined by claim 4, wherein said sleeve is coupled to said tool interface block by means of a plurality of shear pins.

6. The cable head connector as defined by claim 5, wherein said tool interface block includes fishing-neck grooves.

* * * * *